No title

(12) United States Patent
Mohan

(10) Patent No.: US 9,467,443 B2
(45) Date of Patent: Oct. 11, 2016

(54) AUTHENTICATION UTILIZING A DYNAMIC PASSCODE FROM A USER-DEFINED FORMULA BASED ON A CHANGING PARAMETER VALUE

(71) Applicant: Ram Balasubramaniam Mohan, Santa Clara, CA (US)

(72) Inventor: Ram Balasubramaniam Mohan, Santa Clara, CA (US)

(*) Notice: Subject to any disclaimer, the term of this patent is extended or adjusted under 35 U.S.C. 154(b) by 123 days.

(21) Appl. No.: 14/468,347

(22) Filed: Aug. 26, 2014

(65) Prior Publication Data

US 2015/0163218 A1 Jun. 11, 2015

Related U.S. Application Data

(60) Provisional application No. 61/913,389, filed on Dec. 9, 2013, provisional application No. 61/917,948, filed on Dec. 19, 2013.

(51) Int. Cl.
*H04L 29/06* (2006.01)
*G06F 21/45* (2013.01)
*G06F 21/31* (2013.01)

(52) U.S. Cl.
CPC ........... *H04L 63/0846* (2013.01); *G06F 21/31* (2013.01); *G06F 21/45* (2013.01)

(58) Field of Classification Search
CPC ... H04L 63/0846; H04L 67/10; G06F 21/45; G06F 21/31
USPC ........................................................... 726/6
See application file for complete search history.

(56) References Cited

U.S. PATENT DOCUMENTS

| 7,058,613 | B1* | 6/2006 | Sato ................. G06F 21/34 705/72 |
| 2010/0100724 | A1 | 4/2010 | Kaliski |
| 2010/0153276 | A1 | 6/2010 | Wong |
| 2010/0246811 | A1* | 9/2010 | Sadler ................. H04L 9/3226 380/28 |
| 2011/0247045 | A1 | 10/2011 | Rajagopal et al. |
| 2013/0263235 | A1 | 10/2013 | Daigle |

FOREIGN PATENT DOCUMENTS

| CN | 1703002 | 11/2005 |
| CN | 101178802 | 11/2006 |
| CN | 101425118 | 10/2007 |
| CN | 101877636 A | 4/2009 |
| EP | 2093691 | 8/2009 |
| WO | WO 2010/022274 | 2/2010 |

* cited by examiner

*Primary Examiner* — Baotran N To
(74) *Attorney, Agent, or Firm* — Law Office of Dorian Cartwright; Dorian Cartwright

(57) ABSTRACT

An authentication system utilizes dynamic passcode from a user-defined formula based on a changing parameter value. The changing parameter is publicly accessible through the communication network and has a current value that is periodically updated, such as a stock value, temperature at a specific location, or a sports score. The user-defined formula is based on the changing parameter in order to derive a passcode which authenticates a user to an associated user account. As referred to herein, the user-defined formula is a mathematical formula in which the changing parameter is one variable (e.g., [changing parameter value]+1). Some formulas include more than one changing parameter.

17 Claims, 8 Drawing Sheets

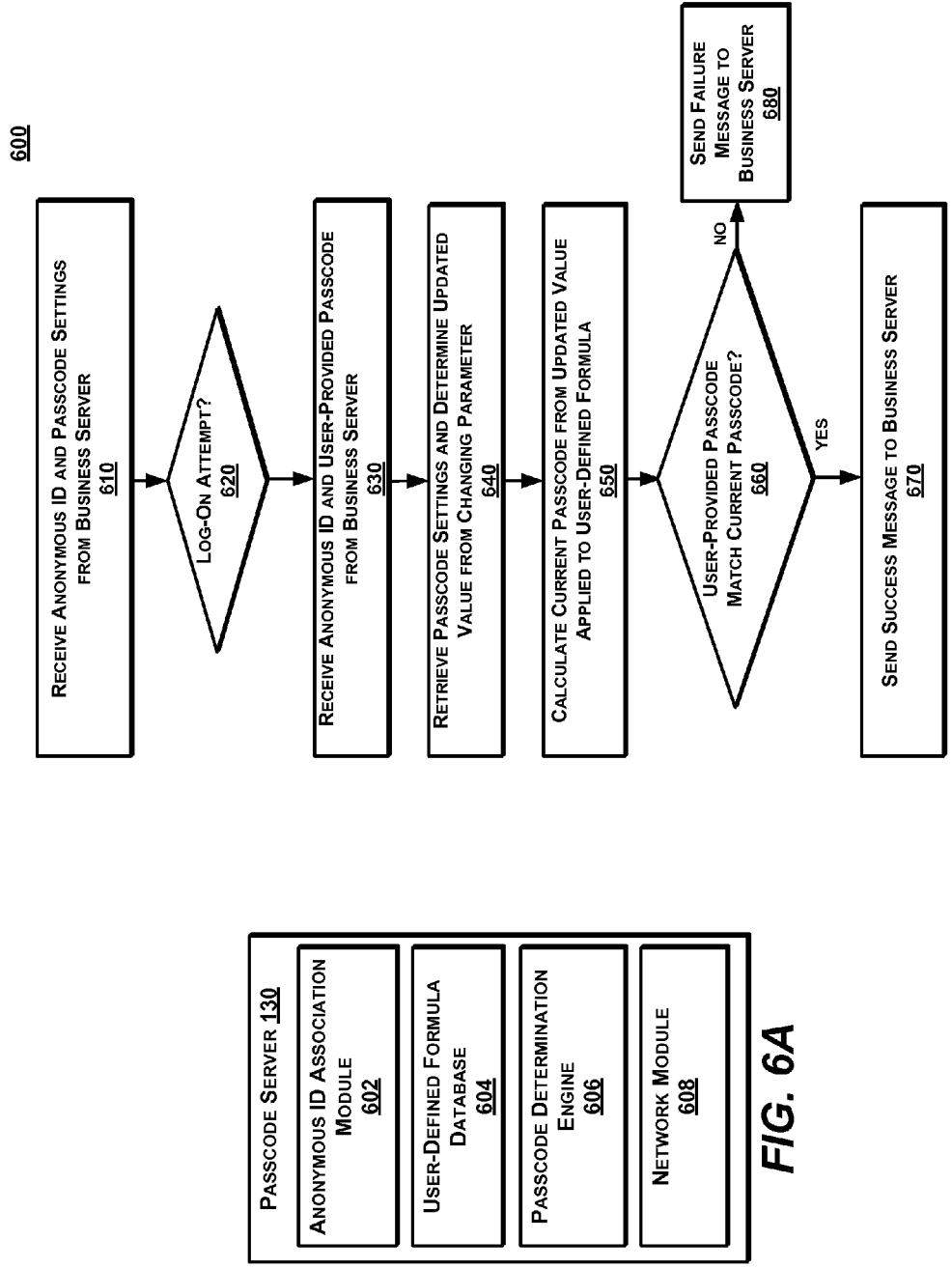

|  | MONDAY | TUESDAY |
|---|---|---|
| NFLX STOCK | 445 | 433 |
| SAN MOSE WEATHER | 81 | 82 |

*FIG. 7*

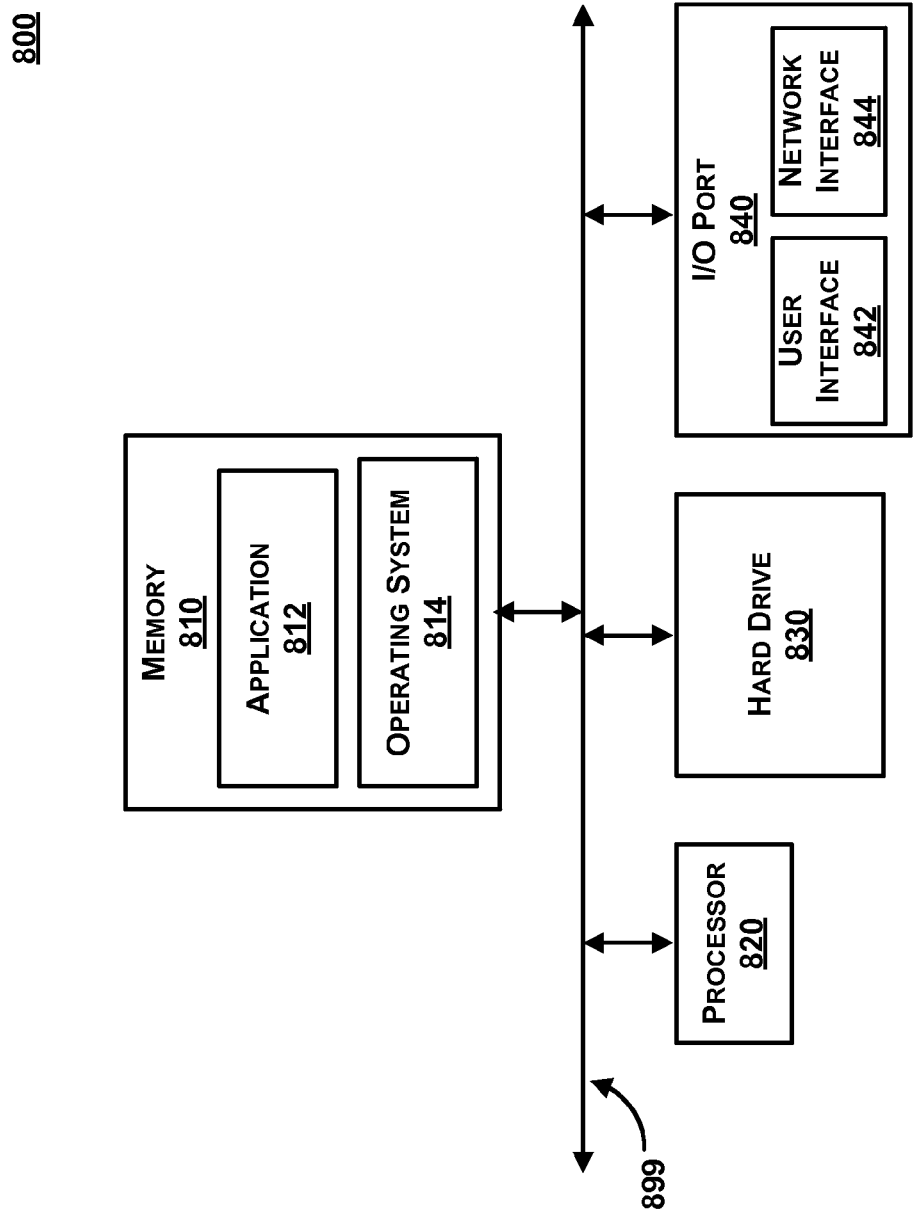

AUTHENTICATION UTILIZING A DYNAMIC PASSCODE FROM A USER-DEFINED FORMULA BASED ON A CHANGING PARAMETER VALUE

CROSS-REFERENCES TO RELATED APPLICATIONS

This application claims the benefit of U.S. Provisional Application No. 61/913,389 filed Dec. 9, 2013, by Ram Mohan and entitled USER DEFINED DYNAMIC PASSCODE GENERATION, and U.S. Provisional Application No. 61/917,948 filed Dec. 19, 2013, by Ram Mohan and entitled USER DEFINED DYNAMIC AUTHENTICATION CODE GENERATION, the contents of each being hereby incorporated by reference.

FIELD OF THE INVENTION

The invention relates generally to online security and more specifically, deriving and applying dynamic passcodes from a changing parameter of a user-defined formula.

BACKGROUND OF THE INVENTION

The current authentication paradigm typically utilizes static passwords for accessing user accounts. For example, a challenge-response script can request a secret username and/or password be presented as credentials. During an initial set-up or configuration of user accounts, users select a username and password.

Problematically, passwords can be compromised over time by theft, changing personnel, user error, and many other reasons. Consequentially, users need to manually configure a new password to restore security. The task becomes burdensome for highly secure systems that require frequent password updates. Furthermore, users may be unable to memorize a constantly changing password, especially due to the number of different systems now requiring passwords for access.

One current solution to providing a dynamic password requires users to carry a password-generating device that continuously displays an updated password. Because the device uses an algorithm that is synched with a security server, both have access to the same password at the same time, and to an updated password at a later time.

Unfortunately, users need to carry the password-generating device for use when account access is needed. Furthermore, if the device is lost or stolen, the user account can be comprised and a user loses access to the account until a new device is issued.

What is needed is a robust technique to provide the security level of dynamic passwords while maintaining ease-of-use for users with a user-defined formula that remains static.

SUMMARY OF THE DISCLOSURE

To overcome the deficiencies of the prior art, systems, methods, and computer-readable mediums for authentication with a passcode that utilizes a changing parameter as a variable in a static user-defined formula, is provided.

In an embodiment, a changing parameter is established as a baseline for a passcode. The changing parameter can be publicly accessible through the communication network and have a current value that is periodically updated, such as a stock value, temperature at a specific location, or a sports score, or accessible at least to the user and the security server such as the current time, IP address and MAC address on the user's computer or mobile device A user-defined formula is based on the changing parameter in order to derive a passcode which authenticates a user to an associated user account. As referred to herein, the user-defined formula is a mathematical formula in which the changing parameter is one variable (e.g., [changing parameter value]+1 or [changing parameter value]−9). Some formulas include more than one changing parameter.

In another embodiment, responsive to detecting an attempt to access the user account, a current value of the changing parameter is retrieved. A current passcode based on the current value of the changing parameter as applied to the user-defined formula. Additionally, a passcode provided by the user privy to the same changing parameter. If the current passcode to the user-provided passcode matches, access to the user account is allowed.

Advantageously, the security level of dynamic passwords is achieved while maintaining the ease-of-use to users of static passwords.

BRIEF DESCRIPTION OF THE DRAWINGS

In the following drawings, like reference numbers are used to refer to like elements. Although the following figures depict various examples of the invention, the invention is not limited to the examples depicted in the figures. Blocks of block diagrams are not strictly bound and intended to group functionality that can be implemented by one or more hardware or software components. Steps of flow diagrams are not strictly ordered.

FIGS. 6A-B are more detailed diagrams illustrating a passcode server of the system of FIG. 1 and methods of the passcode server, according to some embodiments.

FIG. 7 is a schematic diagram illustrating a changing parameter and user defined formula, according to some embodiments.

FIG. 8 is a block diagram illustrating a generic computing device for use in components of the system of FIG. 1, according to one embodiment.

DETAILED DESCRIPTION

To address these drawbacks, systems, methods, and computer-readable mediums for authentication with a passcode that utilizes a changing parameter in a user-defined formula, is provided. As referred to herein, the user-defined formula is a mathematical formula in which the changing parameter is one variable (e.g., [changing parameter value]+1 or [changing parameter value]−9). Some formulas may include more than one changing parameter.

The description details authentications to user accounts, such as: authentication through a mobile device to an e-mail account over the a wireless connection to the Internet; authentication through an ATM machine to a bank account over a secure connection; authentication through a home security alarm to an owner account over a telephone connection; and the like. More generally, the description herein sets forth exemplary preferred embodiments, and given the teachings herein, can be modified by one of ordinary skill in the art for specific implementations, and additional options.

High-Level Authentication Systems and Methods

Figure 1:
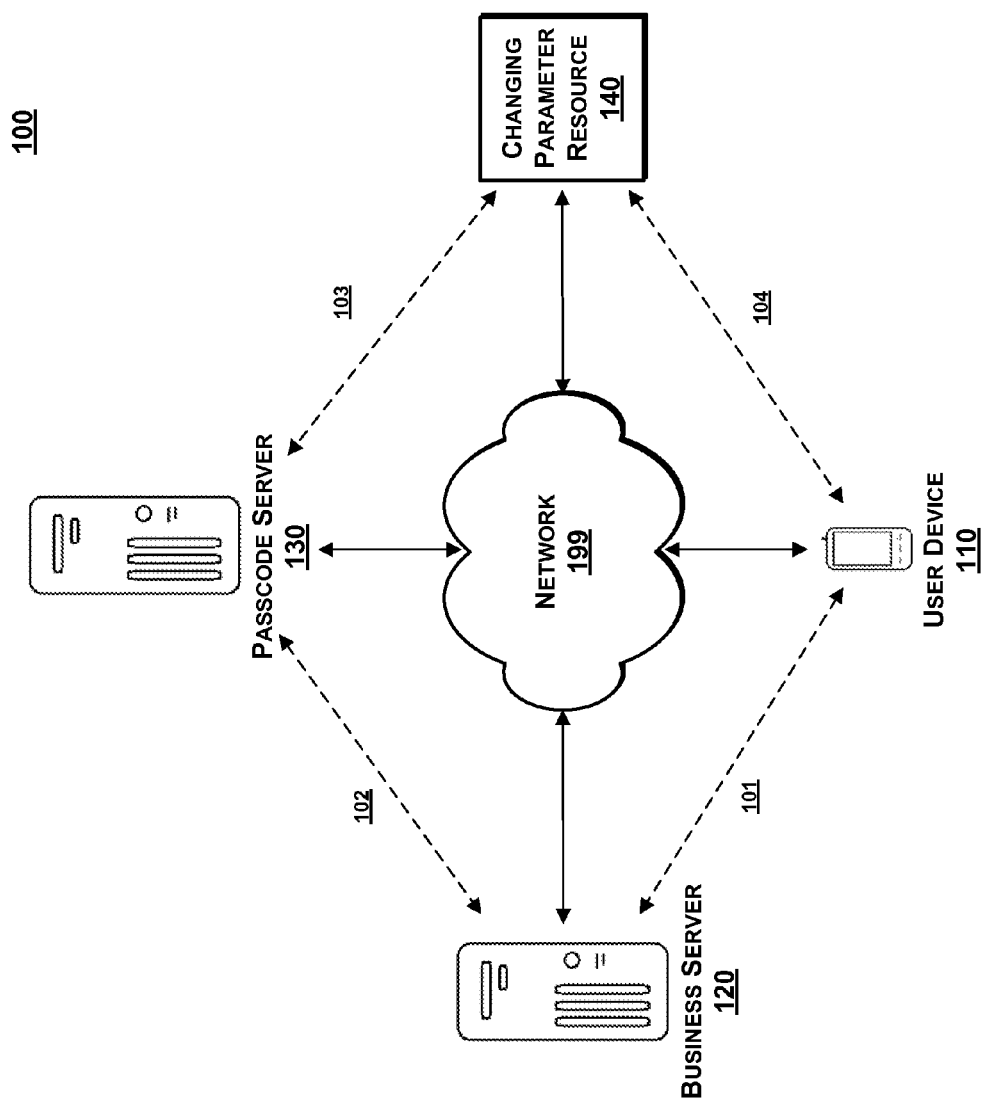
FIG. 1 is a high-level block diagram illustrating an authentication system to utilize user-defined formulas with a changing parameter, according to one embodiment.

FIG. 1 is a high-level block diagram illustrating an authentication system 100 to utilize user-defined formulas with a changing parameter, according to one embodiment. The system 100 comprises a user device 110, a business server 120, a passcode server 130 and a changing parameter resource 140. There can also be other components in the system 100, such as firewalls, access points, switches, content servers, and the like. Further, the system 100 can include more than the one instance shown (e.g., multiple passcode servers 130).

Components are directly coupled to a network 199 (e.g., a LAN, WAN, the Internet, a cloud-based network, a data network, a cellular network, a hybrid network, or the like). Through the network 199, components are also coupled in communication through network services such as HTML and FTP or any other higher-level communication protocol. More specifically, the user device 110 communicates with the business server 120 over connection 101, which in turn communicates with the passcode server 130 over connection 102. Both the user device and the passcode server can independently communicate with the changing parameter resource 140 over connections 103 and 104. Additional component-to-component communications are possible.

The user device 110 can be, for example, a (stationary) personal computer, a laptop computer, a tablet computer, a smart phone, a mobile computing device, an Internet appliance, an ATM machine, a non-wireless device modified to have wireless capabilities, or any other computing device (see generally, FIG. 8). The user device 110 serves as an interface for a user to configure and access user accounts. When logging-on, the user device can also reach the changing parameter resource 140 in order to retrieve a latest parameter value in sync with the passcode server 130. Users enter user-provided passcodes via keypads or touchscreens in order to access user accounts for display on the user device 110. In some embodiments, such as when pop mail is configured, the passcode can be provided programmatically between an e-mail client (e.g., Outlook) and an e-mail provider (e.g., Gmail). Additional embodiments of the user device 110 and methods operating therein, are described below with respect to FIGS. 4A-B.

The business server 120 can be any of the computing devices listed for the user device 110, in addition to one or more server blades. The business server 120 can merely represent a collection of back-end virtual resources. The business server 120 provides access to the user accounts for the user device 110. Examples of user accounts includes e-mail accounts, financial services accounts, social media accounts, health insurance accounts, corporate accounts, educational accounts, and the like. In some embodiments, authentication responsibilities are off-loaded to the passcode server 130. The segregated architecture also strengthens security by decoupling authentication information. In case hackers compromise the business server 120, the hacker will still be unable to decipher the user accounts stored there. To do so, the business severs 120 tracks usernames to an anonymous ID that is passed to the passcode server 130. In some embodiments, the passcode server 130 is integrated with the business server 120.

The passcode server 130 can also be any of the computing devices listed for the user device 110, in addition to one or more server blades. The passcode server 130 can be operated by a third party that services many various business servers 120. The passcode server 130 can also be operated by the same entity as the business server 120. In one embodiment, the passcode server 130 maintains user-defined formulas for authentication. During a log-on attempt, the passcode server 130 retrieves an updated changing parameter value and determines the success or failure of user-provided passcodes to match updated passcodes.

The changing parameter resource 140 is any of the disclosed computing devices capable of communicating a current changing parameter value. Examples of a changing parameter value can include, a stock or index value at a designated point in time (e.g., end of last business day, quarter or hour), a number of points scored by a favorite sports team, the current time (at a current or other time zone), a random number, a calendar value, a temperature from a specified location or even the specified location as reported by a certain website, or any appropriate dynamic value. The changing parameter can also be alpha-numeric, for example, the first word printed in the first page of New York Times each morning, converted to a numeric value. The user device 110 displays a value for users to apply a memorized or written down formula in deriving a user-provided passcode, while the passcode server 130 also retrieves the value for deriving a current passcode, for comparison to the user-provided passcode. The changing parameter resource 140 can push updated parameter values upon change, or alternative, provide updated parameter values on demand.

In some embodiments, the current time on the user device 110 is used as the changing parameter and serves as the changing parameter resource 140. In this case the passcode server 130 will communicate with the user device 110, acting also as changing parameter resource 140 in order to obtain changing parameter value. The current time can be provided explicitly from for example from a ping, or implicitly for example from timestamps in communication packets.

Figure 2:
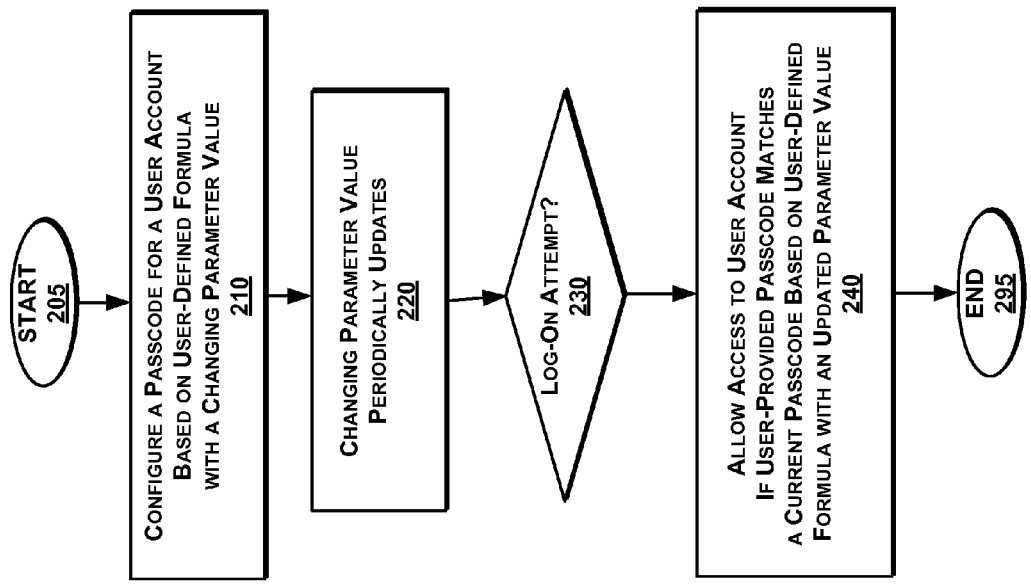
FIG. 2 is a high-level flow diagram illustrating a method for authentication utilizing user-defined formulas with a changing parameter, according to one embodiment.

FIG. 2 is a high-level flow diagram illustrating a method 200 for authentication utilizing user-defined formulas with a changing parameter, according to one embodiment. Some steps of the method 200 are described in more detail in the following section.

At step 210, a passcode for a user account based on a user-defined formula is defined. The user-defined formula includes a changing parameter value. As discussed in more detail herein, the changing parameter value can be a temperature or stock value, for example. The user-defined formula can be a mathematical formula such a [changing parameter value]×[2]. In some cases, the user-defined formula includes multiple changing parameter values, such as [changing parameter value 1]–[changing parameter value 2]. In other embodiments, the user-defined formula can be an operation other than mathematical. An example of a text-based user-defined operation can be to identify the first word of the first headline of the New York Times as printed online. In still other embodiments, the identified word can be a changing parameter value that is applied to a user-defined formula, such as switching the first and last letters. If the word is "Iraq", the corresponding passcode would be "Qrai" in one case. In alternative embodiments, automatically-defined formulas can be programmatically generated for a user, or even for device to device authentication. For example, a can device define its own formula for use in authenticating to another device such as when providing single-sign-on features.

At step 220, the changing parameter value periodically updates. The dynamic nature of values depends on its source. A stock value can change every few seconds, while a daily closing stock value changes daily. Further, public interest rates may be updated quarterly, or asynchronously.

At step 230, a log-on attempt is detected. When a user directs a browser to a web page, a log-in screen can be automatically served, or the user can request a log-in. A passcode is entered along with other information. For a first factor log-on, only the passcode is required. Additional identify information can be included, such as MAC address, time of day, or a second factor. For a second factor log-on, a username and passcode, or some other combination, are entered. For a third factor log-on, a username, a password, and a passcode, or some other combination, are entered.

At step 240, access to a user account is allowed if a user-provided passcode matches a current passcode. Both passcodes are based on a user-defined formula with an updated parameter value. A user-provided passcode is compared with a system-calculated value for verification.

Figure 3:
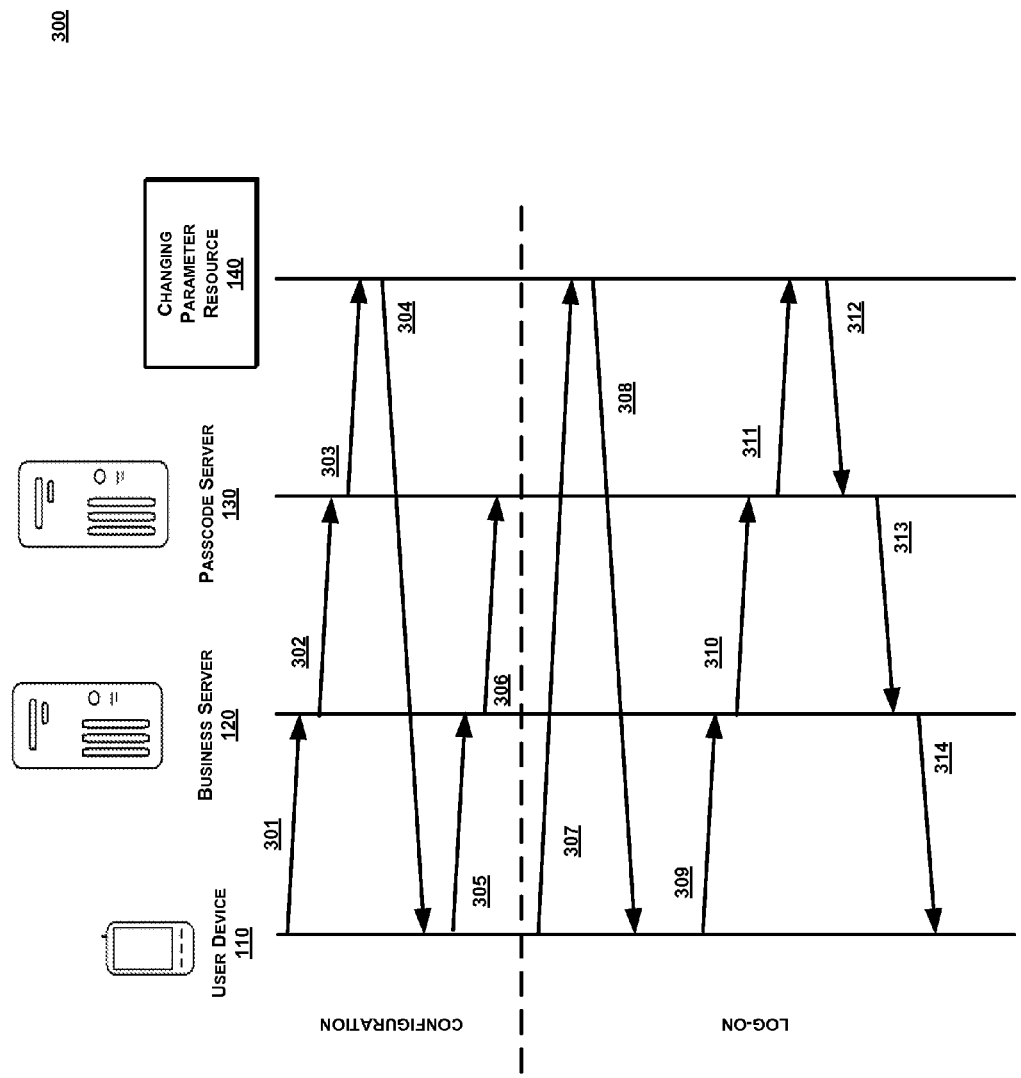
FIG. 3 is an interaction diagram illustrating inputs and outputs between components of the system of FIG. 1, according to one embodiment.

FIG. 3 is an interaction diagram illustrating inputs and outputs 300 between components of the system of FIG. 1, according to one embodiment.

In a first phase, passcodes are configured. At interaction 301, a user device 110 sends configuration data to the business server 120. The configuration data can include a username, a password, a changing parameter setting and a user-defined formula (i.e., depending upon whether authentication is 1st factor, 2nd factor or 3rd factor, as described below). In some embodiments, the configuration data is sent together, and in other embodiments, over different communication transactions. At interaction 302, the business server 120 sends an anonymous ID corresponding to the username to the passcode server 130 to complete configuration. At interaction 303, the passcode server 130 retrieves a current parameter value from the changing parameter resource 140.

In an optional embodiment, at interaction 304, the current parameter value is sent from the changing parameter resource 140 (either directly or indirectly) to the user device 110 for display to a user. In this case, at interaction 301, the user device 110 merely requests a changing parameter resource (either directly or indirectly). It is after this display that, at interaction 305, a changing parameter setting and user-defined formula is sent to the business server 120, and at interaction 306 from the business server 120 to the passcode server 130, using an anonymous ID.

In a second phase, passcodes are verified. At interaction 307, a user device 110 requests an updated parameter value from the changing parameter resource 140, which is returned at interaction 308. This allows a user to apply a user-defined formula to derive a user-provided passcode.

At interaction 309, the user-provided passcode and other information, such as a username and password (i.e., depending on the factor level of authentication) are sent to the business server 120. At interaction 310, the business server 120 sends an anonymous ID corresponding to the username to the passcode server 130. At interaction 311, the passcode server requests an updated parameter value from the changing parameter resource 140, which is returned at interaction 312 to calculate an updated passcode.

At interaction 313, a success message (or failure message) of passcode matches is sent from the passcode server 130 to the business server 120. At interaction 314, the business server 120 sends a user interface allowing access to user accounts (or a denial of access) to the user device 110.

Detailed Components of Authentication Systems and Methods

FIGS. 4A-D are more detailed diagrams illustrating the user device 110 of the system of FIG. 1 and user interfaces of the user device 110, according to some embodiments.

Figure 4C:
FIGS. 4A-D are more detailed diagrams illustrating a user device of the system of FIG. 1 and user interfaces of the user device, according to some embodiments.
Figure 4D:
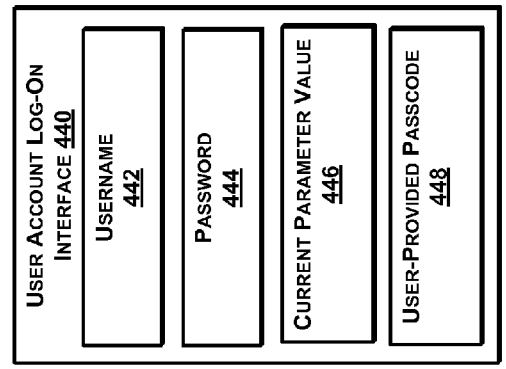
Figure 4B:
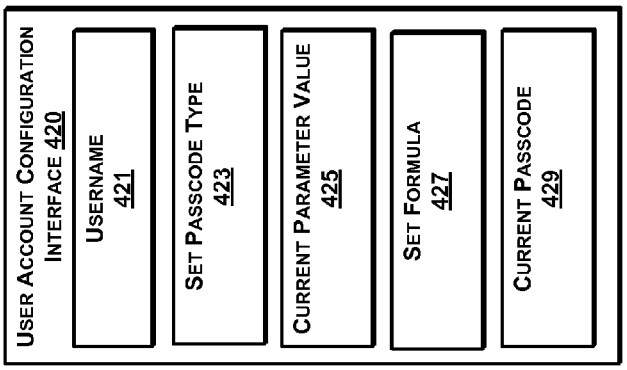
Figure 4A:
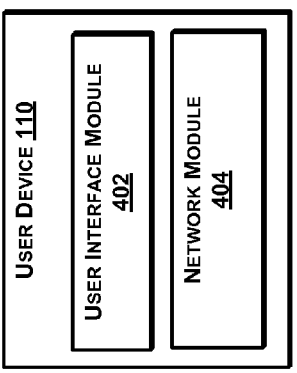

The user device 110 further comprises a user interface module 402 and a network module 404. The user interface module 402 can be a network browser, an application, or the like. The user interface module 402 can display user interfaces on a screen of the user device 110 as exemplified in a user account configuration interface 420 (FIG. 4B), a user account log-on interface 430 (unprompted)(FIG. 4C), and a user account log-on interface 440 (prompted)(FIG. 4D). The network module 404 represents lower level network communication software and/or hardware.

The user account configuration interface 420, is an exemplary implementation, and allows a user to set-up for future authentication to a user account. A username 421 identifies a user and typically persists even when passwords and passcodes change. A passcode type 423 sets a baseline for a user and an authentication system when logging-on. Types can be pre-populated to a few verified and reliable choices. Alternatively, a user can configure a custom passcode type by providing, for example, a web site address of how to retrieve updated values. In one embodiment, a current parameter value 425 of a changing parameter value is displayed by an authentication system to the user for confirmation. The current parameter value 425 may show an update while the user is configuring. A set formula 427 portion of the interface 420 allows the user to describe how a changing parameter value with mathematical, or other types of operations, of a user-defined formula. A current passcode 429 is calculated by applying the current parameter value 425 to a user-defined formula as set, and is displayed by an authentication system to a user for confirmation. A user can iteratively make adjustments to configuration settings through the interface 420. Further, updates can be made at a later time.

The user account log-on interface 430 is displayed during an unprompted log-on. As such, a username 432, a password 434 and a user-provided passcode 436 are entered by the user. By contrast, the user account log-on interface 440 is displayed during a prompted log-on. In this embodiment, a current parameter value 446 is displayed, or prompted, by an authentication system while a user is entering a username 442, a password 444, and a user-provided passcode 448. The latter embodiment relieves users from having to independently determine the current parameter value 446. However, the former embodiment may be more secure because the current parameter value 446 remains secret.

An authentication system is also configurable to use varying levels of log-on factors. A first factor only requires a user-defined passcode to be provided by users, while a second factor further requires a username, and a third factor also requires a password.

In the first factor embodiment, there is no specific username indicated, so no specific user account is retrieved. This can be useful for indexing information that is public, but at a secret location. For example, sharing a secret HTML link for a draft version of a blog to a friend to review. Alternatively, a first factor embodiment can be used with any additional hidden user identifier such as the user's device MAC address or IP address, or second factor entered by the user.

The second factor embodiment links a particular user account. For instance, a user can access an e-mail account, an online storage account, an exercise tracking account on an aerobics machine, or the like. The third factor embodiment can be used for more sensitive user accounts such as bank accounts, user administration accounts, or the like. Of course, higher security can come at a cost of less convenience for users.

Figure 5B:
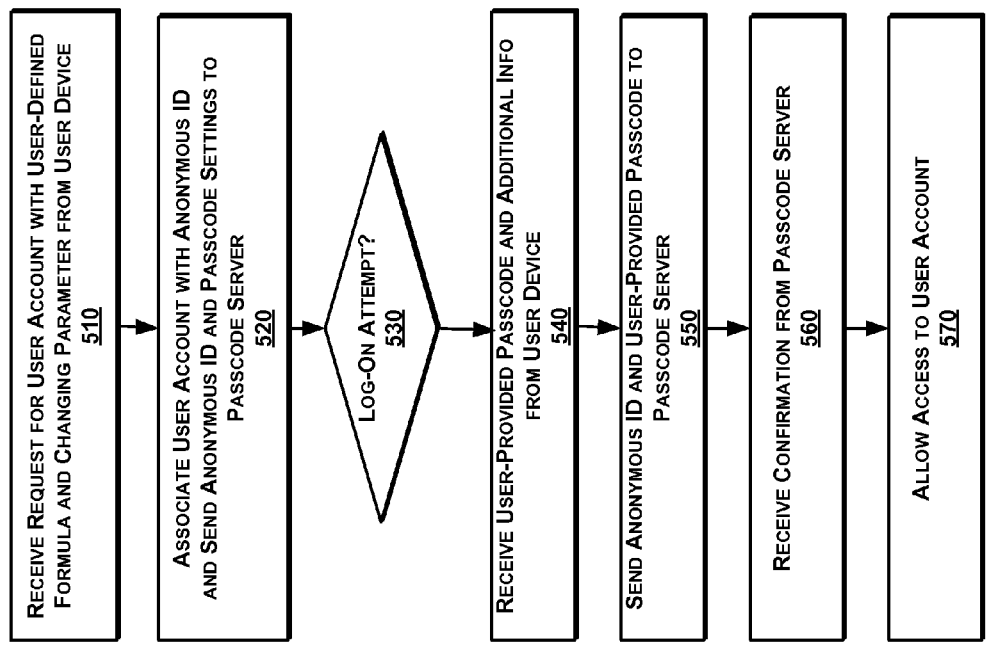
FIGS. 5A-B are more detailed diagrams illustrating a business server of the system of FIG. 1 and methods of the business server, according to some embodiments.
Figure 5A:
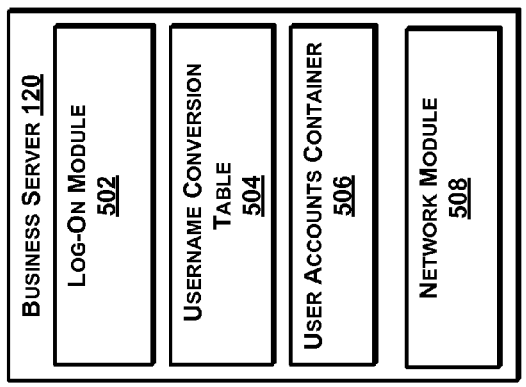

FIGS. 5A-B are more detailed diagrams illustrating the business server 120 of the system of FIG. 1 and methods of the business server 120, according to some embodiments. The business server 120 further comprises a log-on module 502, a username conversion table 504, a user accounts container 506, and a network module 508. One of ordinary skill in the art will recognize that the module architecture can be modified, and the associated functionality shown as performed by the business server 120 is only for the purpose of illustration as the same functionality may be performed by other components of the authentication system 100.

At step 510 of a method 500, the log-on module 502 receives a request to open a user account (e.g., from a user device 110). The request can be accompanied by a user-defined formula and a changing parameter setting and other information, depending on a factor level.

At step 520, an association between a username and an anonymous ID is stored in the username conversion table 504. By doing so, the business serve 120 keeps usernames invisible from the passcode server 130. Thus, a hacker would need to compromise two independent components in order to match the association to log-on authentication. The username conversion table 540 can be a relational database record that is part of a user account, or a separate table of rows and columns, for instance.

At step 530, a log-on attempt causes the log-on module 502 to receive a user-provided passcode and additional information (e.g., from a user device 110), at step 540. At step 550, the log-on module 502 sends an anonymous ID as determined from the username conversion table 504 for transmission to the passcode server. Next, at step 560, the log-on module 502 receives confirmation from the passcode server 130 that the user-provided passcode was successfully matched or not. If successful, the log-on module 502 allows a user access to a user account stored in the user accounts container 506, at step 570.

The network module 508 provides a communication channel to perform transactions over a physical communication network. When connecting to the Internet, the network module 508 can represent generic services to an application for packetizing data sent to and received for the application. The network module 508 can also represent transceivers (e.g., wireless), a cable receptacle, NIC cards, and the like.

FIGS. 6A-B are more detailed diagrams illustrating the passcode server 130 of the system of FIG. 1 and methods of the passcode server 130, according to some embodiments. The passcode server 130 comprises an anonymous ID association module 602, a user-defined formula database 604, a passcode determination engine 606, and a network module 608.

At step 610 of a method 600, the anonymous ID association module 602 receives an anonymous ID and passcode settings from the business server 120, and generates a record in the user-defined formula database 604.

Responsive to a log-on attempt at step 620, the anonymous ID association module 602 receives an anonymous ID and a user-provided passcode from the business server 120, at step 630, in order to identify corresponding passcode settings. At step 640, a passcode determination engine 606 retrieves passcode settings from the user-defined formula database 604. Further, a changing parameter resource 140 is accessed to get updated changing parameter values. At step 650, the passcode determination engine 606 calculates a current passcode from the updated parameter value as applied to the user-defined formula.

At step 660, the passcode determination engine 606 compares a user-provided passcode to a current passcode (and other factors if multi-factor). If the passcodes match, the log-on is successful and an appropriate message is sent to the business server 120, at step 670. Otherwise, a failure message is sent at step 680.

FIG. 7 is a schematic diagram illustrating exemplary changing parameter values, according to some embodiments. The examples include a NFLX daily stock quote on Monday and Tuesday which yields values of 445 and 433, respectively. Also, a San Jose daily average temperature yields value of 81 and 82, respectively. One of ordinary skill in the art will recognize endless 0different values that can be utilized based on particular implementations, and available resources.

General Computing Devices and Networking Environment

FIG. 8 is a block diagram illustrating a generic computing device for use in components of the system of FIG. 1, according to one embodiment. The computing device 800 is an exemplary device that is implementable for each of the components of the system 100, including the user device 110, the business sever 120, the passcode sever 130, and the changing parameter resource 140. Additionally, the computing device 800 is merely an example implementation itself, since the system 100 can also be fully or partially implemented with laptop computers, tablet computers, smart cell phones, Internet appliances, and the like.

The computing device 800, of the present embodiment, includes a memory 810, a processor 820, a storage device 830, and an I/O port 840. Each of the components is coupled for electronic communication via a bus 899. Communication can be digital and/or analog, and use any suitable protocol.

The memory 810 further comprises network applications 812 and an operating system 814. The network applications 820 can include the modules of network applications or access points as illustrated in FIGS. 1B and 1C. Other network applications can include 812 a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Microsoft Windows is a trademark of Microsoft Corporation. Other operating systems may be used.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 810 or the storage device 830

The storage device 830 can be any non-volatile type of storage such as a magnetic disc, EEPROM, Flash, or the like. The storage device 830 stores code and data for applications.

The I/O port 840 further comprises a user interface 842 and a network interface 844. The user interface 842 can output to a display device and receive input from, for example, a keyboard. The network interface 844 connects to a medium such as Ethernet or Wi-Fi for data input and output. In one embodiment, the network interface 844 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method on a passcode server that, when executed by a processor, performs a method for authenticating users for accounts over a communication network from dynamic passcodes, based on changing parameters in user-defined formulas, the method comprising the steps of:
   securing a user account, comprising:
      associating, by the processor, the passcode server with a user account for a user for authentication of access to the user account;
      receiving, by a network interface of the passcode server, a changing parameter as a baseline for a passcode, the changing parameter being publicly accessible through the communication network from a changing parameter resource device that is operationally external to and independent of both the user and the passcode server, and having a current value that is periodically updated;
      receiving, by the network interface, a user-defined formula based on at least the changing parameter in order to derive a passcode, the passcode authenticating a user to an associated user account;
      preventing access to the user account until the passcode is provided;
   authorizing the user account, comprising:
      responsive to detecting an attempt to access the user account, retrieving a current value of the changing parameter from the changing parameter resource device;
      determining, by the processor, a current passcode based on the current value of the changing parameter as applied to the user-defined formula;
      receiving, by the network interface, a passcode provided by the user; and
      allowing, by the processor, access to the user account responsive to a match of the current passcode and the user-provided passcode.

2. The method of claim 1, wherein the user-defined formula comprises at least a second changing parameter.

3. The method of claim 1, wherein the user-defined formula comprises a mathematical equation.

4. The method of claim 1, wherein the user-defined formula comprises at least one static parameter in addition to the at least one changing parameter.

5. The method of claim 1, wherein the user account comprises at least one from the group containing: an e-mail account, a financial account, social media account, a health insurance account, a corporate account, and an educational account.

6. The method of claim 1, wherein the changing parameter is provided by a user device.

7. The method of claim 1, further comprising:
   providing a second factor authentication that establishes a user-defined username in addition to the user-defined formula that is provided and compared to a username provided during the detected access attempt before the step of allowing access.

8. The method of claim 7, further comprising:
   providing a third factor authentication that establishes a user-defined third value in addition to the user-defined formula and the username that is provided and compared to a third value provided during the detected access attempt before the step of allowing access.

9. A non-transitory computer readable medium storing instructions that, when executed by a processor, perform a method on a passcode server for authenticating users for accounts over a communication network from dynamic passcodes, based on changing parameters in user-defined formulas, the method comprising the steps of:

securing a user account, comprising:

associating, by the processor, the passcode server with a user account for a user for authentication of access to the user account;

receiving, by a network interface of the passcode server, a changing parameter as a baseline for a passcode, the changing parameter being publicly accessible through the communication network from a changing parameter resource device that is operationally external to and independent of both the user and the passcode server, and having a current value that is periodically updated;

receiving, by the network interface, a user-defined formula based on at least the changing parameter in order to derive a passcode, the passcode authenticating a user to an associated user account;

preventing access to the user account until the passcode is provided;

authorizing the user account, comprising:

responsive to detecting an attempt to access the user account, retrieving a current value of the changing parameter from the changing parameter resource device;

determining, by the processor, a current passcode based on the current value of the changing parameter as applied to the user-defined formula;

receiving, by the network interface, a passcode provided by the user; and allowing, by the processor, access to the user account responsive to a match of the current passcode and the user-provided passcode.

10. The computer-readable medium of claim 9, wherein the user-defined formula comprises at least a second changing parameter.

11. The computer-readable medium of claim 9, wherein the user-defined formula comprises a mathematical equation.

12. The computer-readable medium of claim 9, wherein the user-defined formula comprises at least one static parameter in addition to the at least one changing parameter.

13. The computer-readable medium of claim 9, wherein the user account comprises at least one from the group containing: an e-mail account, a financial account, social media account, a health insurance account, a corporate account, and an educational account.

14. The computer-readable medium of claim 9, wherein the changing parameter is provided by a user device.

15. The computer-readable medium of claim 9, further comprising:

providing a second factor authentication that establishes a user-defined username in addition to the user-defined formula that is provided and compared to a username provided during the detected access attempt before the step of allowing access.

16. The computer-readable medium of claim 15, further comprising:

providing a third factor authentication that establishes a user-defined third value in addition to the user-defined formula and the username that is provided and compared to a third value provided during the detected access attempt before the step of allowing access.

17. A passcode server to authenticate users for accounts over a communication network from dynamic passcodes, based on a changing parameters in user-defined formulas, the passcode server comprising:

a processor; and a memory, comprising:

a first module to associate the passcode server with a user account for a user for authentication of access to the user account;

a second module to receive a changing parameter as a baseline for a passcode, the changing parameter being publicly accessible through the communication network from a changing parameters resource device that is operationally external to and independent of both the user and the passcode server, and having a current value that is periodically updated;

a third module to receive a user-defined formula based on at least the changing parameter in order to derive a passcode, the passcode authenticating a user to an associated user account, wherein access to the user account is prevented until the passcode is provided;

a fourth module to, responsive to detecting an attempt to access the user account, retrieving a current value of the changing parameter from the changing parameter resource device;

a fifth module to determine a current passcode based on the current value of the changing parameter as applied to the user-defined formula;

a sixth module to receive a passcode provided by the user; and a seventh module to allow access to the user account responsive to a match of the current passcode and the user-provided passcode.

* * * * *